United States Patent [19]

Morey et al.

[11] Patent Number: 5,261,306

[45] Date of Patent: Nov. 16, 1993

[54] CIRCULAR SAW BLADE FOR TREE CUTTING AND BUNCHING VEHICLES

[75] Inventors: Norval K. Morey, Weidman; Donald J. Ryan, Sheridan, both of Mich.

[73] Assignee: Wood Technology, Inc., Winn, Mich.

[21] Appl. No.: 843,817

[22] Filed: Feb. 28, 1992

[51] Int. Cl.$^5$ .................... B27B 33/08; B23D 61/04
[52] U.S. Cl. ........................... 83/840; 83/855; 144/34 R; 144/231; 144/241
[58] Field of Search ................ 83/840, 831, 833, 835, 83/838, 839, 853, 855, 698, 842–845, 834; 144/34 R, 231, 241, 218; 407/33, 42, 48, 51; 30/355

[56] References Cited

U.S. PATENT DOCUMENTS

| | | | |
|---|---|---|---|
| 7,603 | 8/1850 | Knowles | 83/855 |
| 2,559,355 | 9/1949 | Grupp | 83/855 |
| 3,362,446 | 1/1968 | Potomak | 407/51 X |
| 3,866,504 | 2/1975 | Claesson et al. | 83/852 |
| 4,164,329 | 8/1979 | Higby | 83/853 X |
| 4,222,298 | 9/1980 | James | 83/855 X |
| 4,326,570 | 4/1982 | Fridley et al. | 144/34 R |
| 4,432,264 | 2/1984 | Scott | 83/835 |
| 4,515,055 | 5/1985 | Scott | 83/835 |
| 4,587,876 | 5/1986 | Erhardt | 83/855 X |
| 4,690,024 | 9/1987 | Chaconas | 83/835 X |
| 4,750,396 | 1/1988 | Gaddis et al. | 83/839 X |
| 4,782,731 | 11/1988 | Huntington | 83/833 X |
| 4,850,407 | 7/1989 | Inkster et al. | 83/835 X |
| 4,921,024 | 5/1990 | Wiemeri et al. | 83/835 X |
| 5,058,477 | 10/1991 | MacLennan | 83/839 |

Primary Examiner—Hien H. Phan
Assistant Examiner—Clark F. Dexter
Attorney, Agent, or Firm—Learman & McCulloch

[57] ABSTRACT

An improved circular saw blade is rotatable in a guard casing having tree receiving vertically aligned openings in its upper and lower plates. The blade has a peripheral surface formed in part by a series of replaceable circumferentially spaced teeth with transverse cutting edges positioned to rotate about a predetermined first radius. The blade also has a series of circumferentially spaced, generally radially projecting backer tooth mounts for receiving the rear surfaces of the teeth. The mounts have sloped peripheral surfaces lying radially inside the first radius of rotation and have rear surfaces generally parallel to the mount front surfaces. The saw further has generally tangentially projecting finger-like guides in a guide region spaced circumferentially forwardly from each tooth to provide a radially extending chip passing slot between each tooth and guide and the guides have peripheral surfaces positioned to rotate radially inside the first arc of rotation about a second arc of rotation. Rearwardly and outwardly extending trailing surfaces extending substantially perpendicularly from the rear surfaces of the mounts lead from the tooth mounts to the guide peripheral surfaces to form the peripheral surfaces of the saw between the tooth mounts and guides. A series of loop shaped openings join to the chip passing slots and have marginal radially angular chip deflecting walls extending at an angle in a forward direction. Fasteners extend chordally through the mounts from the rear of the mounts into the teeth to releasably secure them to the mounts.

17 Claims, 2 Drawing Sheets

CIRCULAR SAW BLADE FOR TREE CUTTING AND BUNCHING VEHICLES

BACKGROUND

This invention relates to large diameter saws such as those provided on tree cutting vehicles of the type which have tree felling and bunching heads which mount the saws in horizontal disposition in housings at the lower ends of the heads to cooperate with tree grasping and bunching arms provided above the housings for collecting and accumulating the severed tree stems. Vehicles of this general type are disclosed in U.S. Pat. Nos. 4,326,570 and 4,471,163, and U.S. Pat. No. 4,921,024 discloses a felling head for such a vehicle which incorporates a guard casing having a tree admitting opening which exposes the saw to a tree to be cut. The patents mentioned are incorporated herein by reference as are the following patents relating to circular saws generally, most to saws of the type used in saw mills.

| | |
|---|---|
| 7,603 | Knowles |
| 1,811,079 | Forsyth |
| 2,559,355 | Grupp |
| 3,362,446 | Potomak |
| 3,866,504 | Claesson et al |
| 4,135,421 | Bertram et al |
| 4,326,570 | Fridley et al |
| 4,432,264 | Scott |
| 4,515,055 | Scott |
| 4,850,407 | Inkster et al |
| 4,921,024 | Wiemeri et al |

Typically, such vehicles today are used for cutting and thinning stands of trees and move along paths in a more or less continuous manner to sever the tree stems or trunks, while leaving the stumps in the ground. Trees up to, for instance, eighteen inches in diameter may be severed, and, if of small diameter, are carried along by the felling head until a bunch is accumulated. They, then, are deposited on the ground by the felling head in a bunch for later gathering by another vehicle. The smaller diameter saws suited to saw mill use are not generally suited to use on such felling heads where, typically, saws may be fifty inches in diameter and it is important to use a reduced number of more widely spaced cutting teeth which cleanly cut standing trees without imposing undue horsepower requirements on the saw drive motor. Normally, saw mill saws are, further, not particularly concerned with transporting the saw chips through some distance to a remote location for discharge, but this is a definite consideration for tree severing circular saws which operate in guard casings and take a considerable bite.

SUMMARY OF THE INVENTION

It is a prime object of the present invention to provide an improved circular saw which is configured to operate most efficiently, in the environment identified, on a tree severing, vehicle-mounted felling head which guards the saw to meet safety requirements.

Another object of the invention is to provide a saw incorporating carbide tipped teeth which are releasably held to backer mounts by a key-keyway coupling through which releasable fasteners chordally extend.

A still further object of the invention is to provide a saw blade of the character described in which guide surfaces forwardly of relatively widely spaced teeth cooperate with guide surfaces of the same radius provided on backer mounts for the teeth to control the depth of cut in a more reliable manner.

Another object of the invention is to provide a saw blade of this type which provides ready access to the tooth fasteners so that an easy replacement of worn or damaged individual teeth is accomplishable in the field, and down time is minimized.

A further object of the invention is to design a circular saw of the type described, which because of its fewer teeth, i.e typically twelve, suffers less damage when operating close to ground level to cut trees growing in stony and rocky soil.

A still further object of the invention is to provide a circular saw which incorporates wood chip transporting pockets which are so configured and disposed as to distribute the chips in the pockets rather than pack them in.

Another object of the invention is to provide a durable, economically manufactured saw, capable of taking cuts having typically a depth of a quarter of an inch, which operates with reduced horsepower.

Other objects and advantages of the invention will become apparent with reference to the accompanying drawings and the accompanying descriptive matter.

THE DRAWINGS

Figure 1:
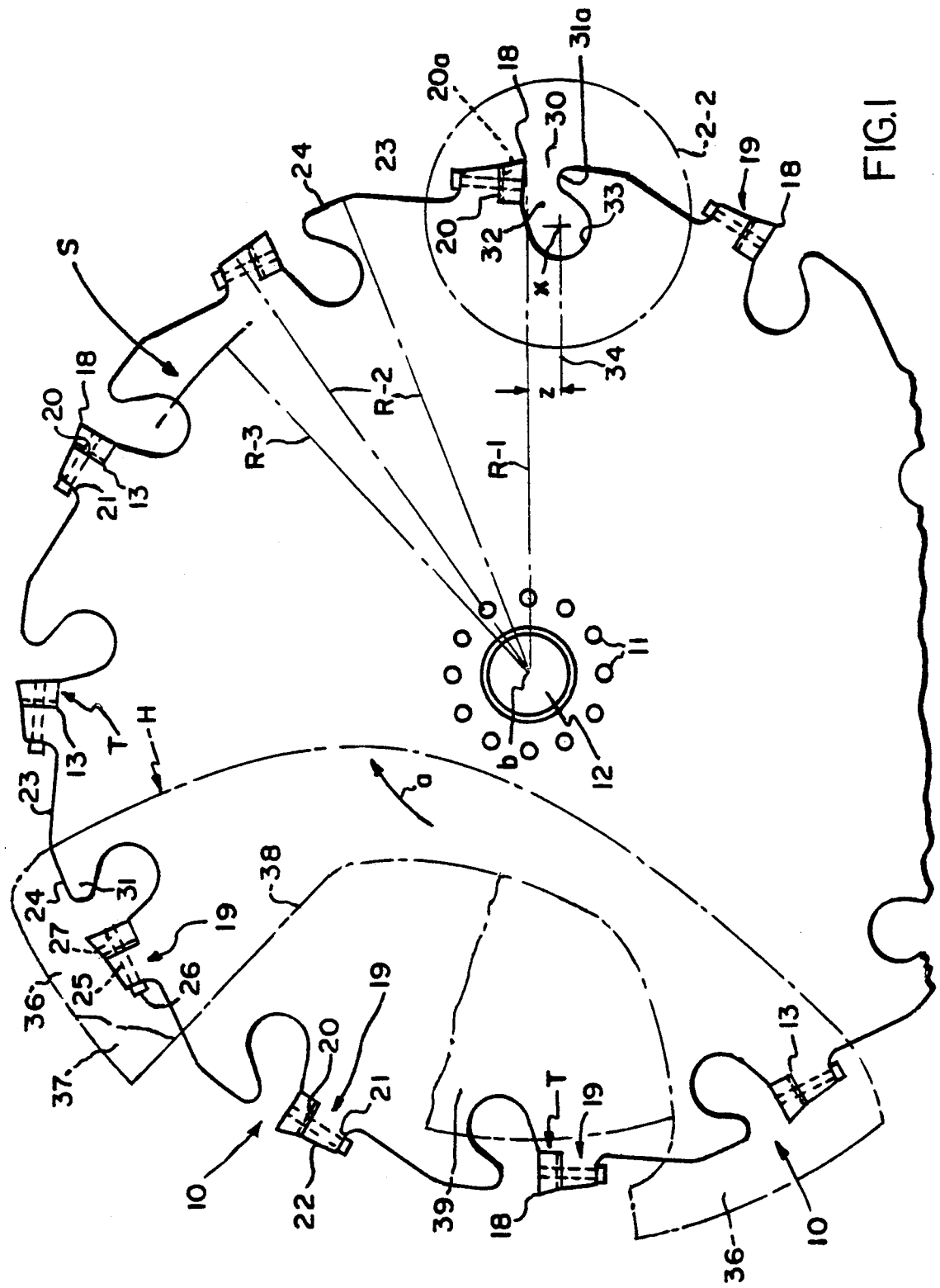
FIG. 1 is a top plan view of the saw, with the teeth illustrated somewhat schematically and the saw guard casing illustrated fragmentarily by chain lines.

Referring now more particularly to the accompanying drawings, a letter S generally indicates the improved circular saw blade or disc which as later will be described operates in a guard housing generally designated H. Provided in the circumferential surface of the blade is a series of uniformly circumferentially spaced openings of predetermined extension and configuration which are generally designated 10 and will also be later more specifically described. With the saw rotating in the direction indicated at "a", as a result of it being secured by bolts 11, or the like, to an arbor or shaft 12 which is driven by a motor, such as a variable speed rotary hydraulic motor, it is the trailing transverse surface of each opening 10 which is provided with a notch 13 for receiving a replaceable carbide tipped tooth, generally designated T. The teeth T, which will later be described in even more detail, each includes transversely extending parallel front and rear faces 14 and 15, a bottom face 16, and an upper wall 17 leading to a forwardly facing cutting edge shown schematically at 18. The edges 18 rotate about equal radii R-1, taken from the axis of revolution "b" of shaft 12.

It will be observed that tooth-like, tooth backing mounts, generally designated 19, formed integrally as a part of saw disc S, are provided adjacent each tooth T. The mounts 19 include transversely extending, front and rear faces 20 and 21, and upper peripheral faces 22, the front faces 20 having central projecting keys 20a (FIG. 4) which are snugly received in keyways 15a provided in the rear faces 15 of the teeth T.

Extending substantially perpendicularly relatively to the rear faces 21 of the mounts 19, are linear, chordal, peripheral surfaces 23, joining to peripheral guide surfaces 24 which are in leading relation to the subsequent tooth T in the direction of rotation of disc S. Surfaces 24 are generated from the axis of rotation about equal radii R-2 which are a predetermined amount shorter in length than the radii R-1. Both the surfaces 22 and 24 on opposite sides of each of the teeth are generated about the same radii R-2 and function to limit the depth of cut to a predetermined distance, e.g. one-quarter inch. It will be noted that the cutting edges 18 are relieved by the tooth surfaces 17 which slope inwardly to meet the upper edges of the mount front faces 20. Provided in each of the mounts 19, are chordally extending openings 25 to receive bolts or other fasteners 26 which extend into threaded openings 27 in the teeth T and securely, but releasably, fix them in position.

Figure 3:
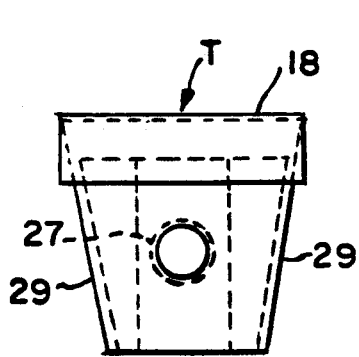
FIG. 3 is an enlarged front elevational view of one of the teeth.
Figure 4:
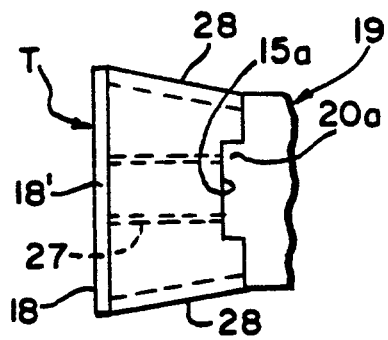
FIG. 4 is a top plan view thereof.

The teeth T may be formed as shown in FIGS. 3 and 4 with a carbide cutting tip 181 brazed or otherwise securely fixed to the tool-steel tooth body to provide the cutting edge 18. The tip 18 is wider than the saw blade S and the tooth body is relieved as at 28 and 29. The front faces 14 of the teeth also extend at an angle "c" to the radii R-1 to provide cutting edge relief.

The configuration of openings 10 differs from the usual gullet and is more advanced than the enlarged prior art gullets. It has been determined that the position and shape of the openings 10 with respect to the cutting edges 18 and front faces of the teeth is critical to carrying the considerable volume of chips generated by each tooth to a remote location for discharge, and to achieving the desired cutting efficiency and increased tooth life.

Figure 2:
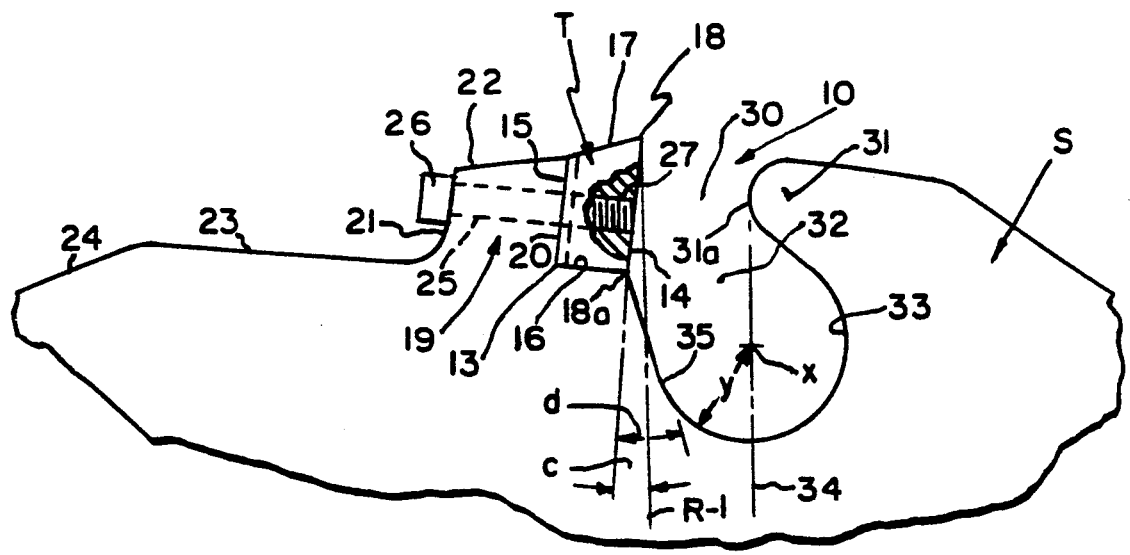
FIG. 2 is an enlarged fragmentary view of the portion of the saw enclosed by the circle 2—2 in FIG. 1.

As in previous saws, each opening 10 includes a gap 30 between the front face 14 of each tooth T and an opposite thumb-like projection 31. The gap 30 leads (FIG. 2) to a throat portion 32 which widens to an enlarged circular pocket portion 33. The center "x" of each circular portion 33 lies on a circle generated by a common radius R-3 and each circular portion 33 is generated about a radius "y" from a center "x". The centers "x" are radially aligned with the surfaces 31a of projections 31 on lines 34 parallel to and offset a distance "z" from radii R-1 extending from axis "b" to each cutting edge 18. Provided for each throat section 32 is a radially inclined deflector wall 35 which extends at a forwardly inclined angle "d" from the inner edge 18a of the front face of each tooth T to merge smoothly with each circular portion 33. The walls 35 deflect chips cut by the teeth T forwardly into the more forwardly located pocket portions 33 so that the chips do not tend to bunch up along one wall of the pockets and spill out.

THE OPERATION

In operation, and with the saw blade S spinning at about 1300 r.p.m., when not under load, the teeth T of the saw are moved into a tree in the path of the vehicle by advancing the vehicle. When larger diameter trees in the neighborhood of 15 to 18 inches in diameter are being cut with a saw in the neighborhood of fifty inches in diameter, and having typically twelve teeth, two teeth T will be in cutting engagement with the tree simultaneously when the saw reaches the mid-portion of the tree. Until this occurs, one tooth will be in cutting engagement with the tree and, of course, this is true for smaller diameter trees and also for larger diameter trees when the saw has progressed in its cut somewhat beyond the mid-portion of the tree. Because the surfaces 24 and 22 are of the same diameter, the bite of each tooth T is positively restricted to avoid the imposition of undue loads on any one tooth and the two point bearing provides a better control of the cut, and a smoother cut which can be achieved with less horsepower.

Saw chips cut by a tooth T are deflected inwardly by the remaining body of the tree through the adjacent gap 30 to impinge upon the angular deflector wall 35 which deflects the chips to distribute them in a more uniform disposition in the adjacent, more forwardly tilted pocket 33. The chips remain in the pocket until the pockets revolve to a position in which they can clear as a result of centrifugal forces. In this connection, it should be understood that the saw blade is guarded from above and below by the non-rotating housing structure generally designated H which has upper and lower guard plates 36 and 37, each provided with a vertically aligned opening 38 to receive a tree. The plates 36 and 37 are of greater diameter than the saw so that the saw is only exposed at the openings 38. It is only exposed at the outer edge of openings 38 because a support shelf 39, supported by plate 36, extends above the saw as indicated in FIG. 1 to provide a support for trees which have been severed while a bunch is accumulating. The kerf of the saw is such that the severed trees slide along the shelf 39 as they are cut and the trees do not bind the saw. The pockets 33 convey the chips and are of such volume and disposition as to do this in a most efficient manner, with radially angled forwardly inclined walls 35 preventing unbalanced packing of the chips in the pockets 33.

Figure 5:
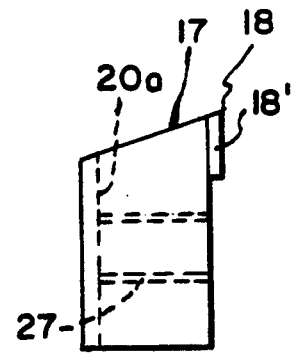
FIG. 5 is a side elevational view thereof.
Figure 6:
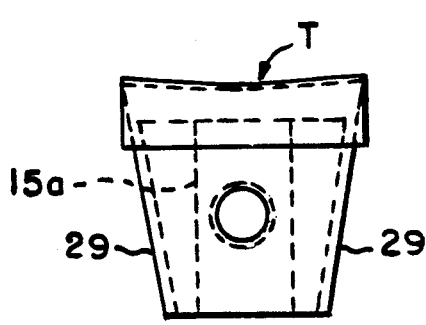
FIG. 6 is a front elevational view of an alternate tooth with a modified cutting tip.
Figure 7:
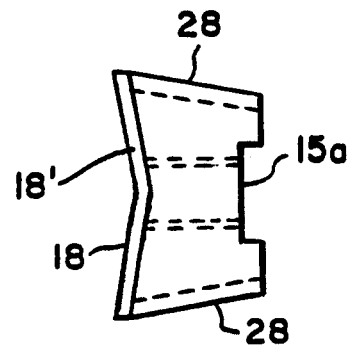
FIG. 7 is a top plan view thereof.

The linear tips shown in FIGS. 3–5 have been found to work well in hardwoods which have a tighter grain. For softer woods, the shallowly V-shaped tips shown in FIGS. 6 and 7 provide a more gradual movement of the tip into the grain and cut the softer woods more cleanly with better definition. The key and keyway relationship at the rear of teeth T provides greater lateral stability during the cut.

It is to be understood that the embodiments described are exemplary of various forms of the invention only and that the invention is defined in the appended claims which contemplate various modifications within the spirit and scope of the invention.

I claim:

1. An improved circular saw blade, for saw guarded feller heads, rotatable in an operative forward direction of rotation about an axis of rotation, and having a peripheral surface formed in part by a series of replaceable circumferentially spaced teeth having flat front, rear, and bottom surfaces, said front surfaces facing in said direction of rotation and extending in a generally radial direction to radially outer transverse cutting edges positioned to rotate in a first arc of rotation about said axis of rotation; the blade having a series of circumferentially spaced, generally radially projecting backing tooth mounts supporting said teeth with notched front surfaces providing flat front and bottom wall surfaces receiving the flat rear and bottom surfaces of said teeth; and mounts having rear surfaces generally parallel to said mount front surfaces and having peripheral surfaces, lying radially inside said first arc or rotation, extending between said front and rear surfaces of said mount; said peripheral surfaces also having generally tangentially projecting finger-like guides in a guide region spaced circumferentially in front of the front surface of each tooth to provide a radially extending chip passing slot between each tooth and guide, the guides having peripheral surfaces positioned radially inside said first arc of rotation and being generated about a second arc of rotation; said saw blade having trailing surfaces extending substantially perpendicularly from said rear surfaces of said mounts and leading substantially linearly from said rear surfaces of said tooth mounts rearwardly and radially outwardly to said guide peripheral surfaces to form peripheral surfaces of the saw blade between said tooth mounts and guides; said blade having a series of loop shaped openings joined to said chip passing slots and extending at an angle in said forward direction of rotation to define said tangentially projecting finger-like guides; said openings having forwardly and radially tilted linear neck portions joined to enlarged generally circular portions; the neck portions incorporating deflector wall surfaces extending from said front surfaces of the teeth radially inwardly at a forwardly inclined angle; and means releasably securing said teeth in position.

2. The saw of claim 1 wherein said teeth slope radially inwardly from said cutting edges to a juncture with their rear surfaces at radially outer edges of the front surfaces of said mounts, and said mounts have outer peripheral bearing surfaces sloping radially inwardly form said outer edges of their front surfaces to assist limiting the depth of cut to a predetermined depth.

3. The saw of claim 2 wherein said teeth securing means comprises chordally extending fasteners extending through said mounts, from the rear surfaces of the mount to the front surfaces thereof, and into said teeth, to secure said teeth releasably in position.

4. A circular saw blade assembly including a saw guard casing with a vertically aligned tree receiving opening provided therein and vertical shaft means extending into the casing from above and supporting a circular saw blade thereon rotatable in an operative forward direction of rotation about an axis of rotation, the saw blade having a peripheral surface of less diameter than said casing and being exposed only at the tree receiving opening, said saw blade being formed in part by a series of replaceable circumferentially spaced teeth having front, rear, and bottom surfaces, said front surfaces facing in said forward direction of rotation and extending generally radially to radially outer transverse cutting edges positioned to describe a first arc of rotation about said axis of rotation; the blade having a series of circumferentially spaced, generally radially projecting backing tooth mounts supporting said teeth, said front surfaces of said mounts being notched to receive said rear surfaces of said teeth, said mounts also having lower surfaces to receive the bottom surfaces of said teeth; said mounts having rear surfaces generally parallel to said mount front surfaces and having peripheral surfaces, lying radially inside said first arc of rotation, extending between said front and rear surfaces of said mounts; said saw peripheral surface also having generally tangentially projecting finger-like guides in a guide region spaced circumferentially in front of the front surface of each tooth to provide a radially extending chip passing slot between each tooth and guide, the guides having peripheral surfaces positioned to rotate radially inside said first arc of rotation about said axis of rotation along a second arc of rotation; and trailing surfaces extending substantially perpendicularly from said rear surfaces of said mounts and leading rearwardly and radially outwardly to said guide peripheral surfaces to form the peripheral surfaces of the saw between said tooth mounts and guides; the saw blade having a series of enlarged pockets joined to said chip passing slots to transport chips in an arc of rotation past said tree admitting opening to a location permitting said chips to be expelled; said enlarged pockets extending at an angle in said forward direction therefrom to define said tangentially projection finger-like guides wherein the pockets have neck sections and a trailing marginal edge of each neck section extends radially inwardly and in said forward direction from a lower front edge of each tooth and at an angle to the front surface of the tooth to provide a deflector wall; and chordally extending fasteners extending through said mounts from the rear surfaces of the mounts to the front surfaces thereof and into the teeth to secure the teeth releasably in position.

5. The saw blade assembly of claim 4 wherein said enlarged pockets have circular portions and said deflector walls merge smoothly with the circular portions of said enlarged pockets.

6. The saw blade assembly of claim 4 wherein said peripheral surfaces on said mounts and said guides are equally radially spaced from said axis of rotation.

7. The saw blade assembly of claim 4 wherein said notched surfaces of said teeth and mounts form intermeshed keys and keyways.

8. The saw blade assembly of claim 4 in which said teeth have carbide cutting tips fixed thereto which extend transversely beyond said saw blade on each side.

9. The saw blade assembly of claim 8 in which said teeth tips are shallowly V-shaped.

10. The saw blade assembly of claim 8 in which said teeth tips are linear.

11. A circular saw blade, rotatable in an operative forward direction of rotation about an axis of rotation and having a blade peripheral surface with generally radially extending recesses therein; a series of replaceable circumferentially spaced teeth received in said recesses and having front, rear, and bottom surfaces, said front surfaces facing in said direction of rotation and extending in a generally radial direction to radially outer transverse cutting edges in a position to describe a first arc of rotation about said axis of rotation; the blade having a series of circumferentially spaced, generally radially projecting tooth-like backing tooth mounts rearwardly adjacent said recesses with front surfaces receiving the rear surfaces of said teeth; said mounts having rear surfaces generally parallel to said mount front surfaces and having peripheral surfaces, lying radially inside said first arc of rotation, extending between said front and rear surfaces of said mounts; said saw peripheral surface also having generally tangentially projecting finger-like guides in a guide region spaced circumferentially in front of the front surface of each tooth to provide a radially extending chip passing slot between each tooth and guide, the guides having peripheral surfaces positioned radially inside said first arc of rotation about a second arc of rotation; and trailing surfaces extending from said rear surfaces of said mounts and leading from said tooth mounts rearwardly and radially outwardly to said guide peripheral surfaces to form the peripheral surfaces of the saw blade between said tooth mounts and guides; the saw blade having a series of enlarged pockets joined to said chip passing slots to transport chips in an arc of rotation to a location permitting said chips to be expelled; said enlarged pockets extending in said forward direction to define said tangentially projecting finger-like guides such that the guides extend rearwardly across a portion of the enlarged pockets and toward the tooth mounts; and chordally extending fasteners extending through said mounts radially inwardly of said blade peripheral surface from the rear surfaces of the mounts to the front surfaces thereof and into the teeth to secure the teeth releasably in position.

12. The saw blade assembly of claim 11 wherein the pockets have neck sections and each neck section has a trailing marginal edge which extends radially inwardly in said direction of rotation from the backing tooth mount at an angle to the front surface of the tooth to provide a chip deflector wall.

13. The saw blade assembly of claim 12 wherein said enlarged pockets have circular portions an said trailing marginal edges providing said deflector walls merge smoothly with said circular portions of said enlarged pockets.

14. The saw blade assembly of claim 13 wherein said peripheral surfaces on said mounts and said guides are equally radially spaced from the axis of rotation of said saw.

15. The saw blade assembly of claim 11 wherein said teeth and mounts have intermeshed keys and keyways.

16. The saw blade assembly of claim 11 in which said teeth cutting edges are shallowly V-shaped.

17. The saw blade assembly of claim 11 in which said teeth cutting edges are linear.

* * * * *

UNITED STATES PATENT AND TRADEMARK OFFICE
CERTIFICATE OF CORRECTION

PATENT NO. : 5,261,306
DATED : November 16, 1993
INVENTOR(S) : Norval K. Morey and Donald J. Ryan It is certified that error appears in the above-identified patent and that said Letters Patent is hereby corrected as shown below:

Column 3, line 22, change "181" to -- 18' --.

Column 4, line 64, change "and" to -- said --; line 66, change "or" to -- of --.

Column 5, line 29, change "form" to -- from --; line 34, change "mount" to -- mounts --.

Column 8, line 2, change "an" to -- and --; line 6, change "13" to -- 11 --.

Signed and Sealed this

Fifth Day of April, 1994

BRUCE LEHMAN

*Attest:*

*Attesting Officer*         Commissioner of Patents and Trademarks